US005618137A

United States Patent [19]

Hawley et al.

[11] Patent Number: 5,618,137

[45] Date of Patent: *Apr. 8, 1997

[54] TAPPING ASSEMBLY

[75] Inventors: Alan M. Hawley, Ocklawaha; Charles C. Mattern, Winter Garden, both of Fla.

[73] Assignee: Earth Resources Corporation, Ocoee, Fla.

[ * ] Notice: The term of this patent shall not extend beyond the expiration date of Pat. No. 5,340,244.

[21] Appl. No.: 590,142

[22] Filed: Jan. 23, 1996

Related U.S. Application Data

[60] Continuation of Ser. No. 227,734, Apr. 14, 1994, Pat. No. 5,507,604, which is a division of Ser. No. 953,931, Sep. 30, 1992, Pat. No. 5,340,244.

[51] Int. Cl.[6] .......... B23B 41/08

[52] U.S. Cl. .......... 408/87; 137/318; 137/320; 141/51; 141/65

[58] Field of Search .......... 408/87, 92, 95, 408/97, 701; 222/5; 137/315, 317, 318, 320; 141/51, 65; 219/121.7, 121.67

[56] References Cited

U.S. PATENT DOCUMENTS

| | | | |
|---|---|---|---|
| 45,183 | 11/1864 | Sexton . | |
| 314,085 | 3/1885 | Van Norman . | |
| 572,786 | 12/1896 | Downey . | |
| 3,495,615 | 2/1970 | Ehrens et al. . | |
| 3,974,846 | 8/1976 | Serota . | |
| 3,983,756 | 10/1976 | Danguillier et al. . | |
| 3,995,655 | 12/1976 | Sands . | |
| 4,350,052 | 9/1982 | Kendall . | |
| 4,399,829 | 8/1983 | Schuler . | |
| 4,475,566 | 10/1984 | Haines . | |
| 4,966,317 | 10/1990 | Barr . | |
| 5,030,039 | 7/1991 | Dove . | |
| 5,076,311 | 12/1991 | Marschke . | |
| 5,163,462 | 11/1992 | Leemput et al. . | |
| 5,163,483 | 11/1992 | Eckman . | |
| 5,340,244 | 8/1994 | Hawley et al. | 408/87 |
| 5,507,604 | 4/1996 | Hawley et al. | 408/87 |

FOREIGN PATENT DOCUMENTS 950614 10/1956 Germany .

OTHER PUBLICATIONS

"Procedures For Welding Or Hot Tapping On Equipment Containing Flammables", *American Petroleum Institute*, Publication 2201, Third Edition, Oct. 1985.

*Primary Examiner*—Daniel W. Howell
*Attorney, Agent, or Firm*—Baker & Botts, L.L.P.

[57] ABSTRACT

A tapping assembly comprising a main valve for selectively opening and closing a valve passageway, a support for holding the main valve adjacent a unit to be tapped, a drill for piercing a wall of that unit with the drill including a housing and a cutting element. A coupler is provided with left-hand threads and right-hand threads for easily connecting and disconnecting the drill housing from the main valve, thereby allowing easy replacement of a drill bit. Vents are provided both upstream and downstream of the main valve for permitting controlled removal of the contents of the unit with the main valve closed and for permitting controlled removal of any contents of the unit from the coupler with the main valve closed.

6 Claims, 4 Drawing Sheets

TAPPING ASSEMBLY

This appliction is a continuation of application Ser. No. 08/227,734, filed Apr. 14, 1994,now U.S. Pat. No. 5,507, 604, which is a divisional of application Ser. No. 07/953,931 filed Sep. 30, 1992, entitled "TAPPING ASSEMBLY", now U.S. Pat. No. 5,340,244.

BACKGROUND OF THE INVENTION

I. Field of the Invention

The present invention relates to an apparatus for removing the contents of pressure vessels with inoperative or damaged valves.

II. Background Information

Pressure vessels are commonly used to store volatile hazardous materials. Should access through valves become impractical, the contents cannot be accessed through ordinary means.

Conventionally, such access has been obtained by supporting a new main valve adjacent the vessel wall or adjacent an existing product line to the vessel. A drilling mechanism is attached to the main valve and a drill bit is accessible through the opened main valve to pierce the walls of the container and/or product line. The drill bit may then be removed from the main valve, the main valve closed, and an eductor tube connected to the main valve in place of the drilling mechanism. The main valve may then be reopened to permit discharge of the contents of the vessel through the eductor tubing.

In known prior art tapping assemblies, should the drill bit become damaged and require replacement, the drilling mechanism must be removed from the main valve. This removal process may prove difficult and time consuming. In addition, with known tapping assemblies, some of the contents of the vessel being tapped may be captured between the main valve and the drilling mechanism and released to the atmosphere upon removal of the drilling mechanism to replace a damaged drill bit.

In addition, with known tapping assemblies it may be difficult or impossible to remove some or all of the content of the vessel being tapped without first removing the drilling mechanism from the main valve. Accordingly, with such prior art tapping assemblies, it is not feasible to readily sample the contents of the tapped vessel after piercing and prior to removal of the drilling assembly.

It is, accordingly, an object of the present invention to provide an improved tapping assembly which permits easy and safe replacement of drill bits.

Another object of the present invention is to readily allow sampling of the contents of a vessel being tapped prior to removal of the drilling assembly.

Additional objects and advantages of the invention will be set forth in part in the description which follows, and in part will be obvious from the description or may be learned by practice of the invention.

SUMMARY OF THE INVENTION

To achieve the foregoing objects, and in accordance with the purposes of the invention as embodied and broadly described herein, a tapping assembly is provided comprising a main valve for selectively opening and closing a valve passageway, a support for holding that main valve adjacent a unit to be tapped, a drilling mechanism for piercing a wall of the unit, the drilling mechanism including a housing and a cutting element; and a coupler, including a cutting element passageway, for connecting, upon rotation of the coupler in one direction, the drill housing to the valve with the coupler aligned to permit, with the valve open, the cutting element to extend from the housing through the cutting element passageway, and through the valve passageway to engage the unit, and further for disconnecting the drill housing from the valve upon rotation of the coupler in the opposite direction to thereby permit replacement of the cutting element.

Preferably, the main valve comprises a ball valve and the support comprises a tapping saddle. It is further preferable that the drill comprise a hydraulic cylinder, a drive shaft inserted into the cylinder and first and second motors for imparting rotational and longitudinal movement respectively to the drive shaft.

In a preferred embodiment, the tapping saddle includes an O-ring groove encircling the path of the cutting element, with the groove being as small in diameter as possible and still permitting passage of the cutting element. The groove is formed to receive a compressible O-ring to thereby provide an effective seal between the tapping saddle and the vessel being tapped.

A further aspect of the invention includes a vent upstream of the main valve to permit controlled removal of the contents of the unit being tapped from that unit and a vent downstream of the main valve to permit controlled removal of the contents of the unit which would otherwise be trapped in the coupler upon closure of the main valve.

DESCRIPTION OF THE PREFERRED EMBODIMENT

Reference will now be made in detail to the present preferred embodiment of the subject invention as illustrated in the accompanying drawings.

Figure 1:
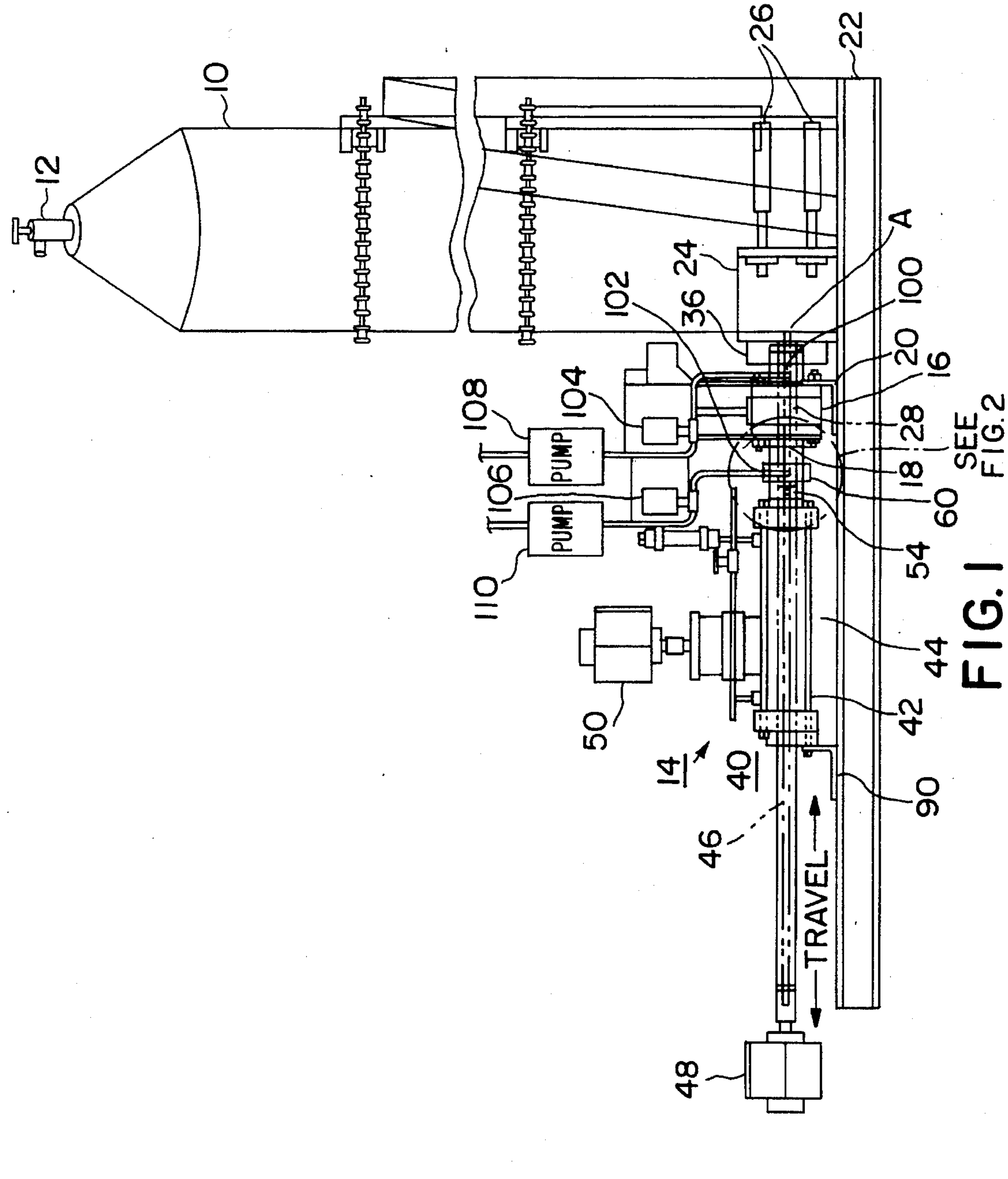
FIG. 1 is a cross-sectional view of a tapping assembly incorporating the teachings of the present invention.

The present invention was developed to allow the contents of moderately pressurized vessels to be accessed in a safe manner without releasing potentially dangerous and environmentally hazardous materials. The primary function is to provide an alternative access to pressure vessels of a variety of sizes in a safe and controlled manner. As shown in FIG. 1, for example, a vessel 10 may comprise a steel storage tank containing a potentially hazardous material such as, for example, sulphur dioxide. In the event valve 12 of vessel 10 were inoperative, it would be necessary to provide an alternative access to the interior of vessel 10 through the operation of a suitable tapping assembly. Access may be obtained either through the walls of vessel 10 or through the walls of access piping connected to vessel 10. For convenience, any portion of vessel 10 or any access piping connected to vessel 10 from which the contents of vessel 10 may be extracted will be generally referred to as the unit to be tapped.

In accordance with the present invention, there is provided a tapping assembly including a main valve having open and closed positions and configured to permit a drill bit or other cutting element to pass through the valve with the valve in the open position. As embodied herein, and as illustrated in FIG. 1, a tapping assembly 14 comprising an air operated main valve 16. Main valve 16 has open and closed positions; main valve 16 is configured so as to permit a drill bit is to pass through valve 16 when valve 16 is in the open position. In the closed position, drill bit 18 cannot pass through valve 16 and the contents of vessel 10 are likewise prevented from passing through valve 16.

As is further shown in FIG. 1, a support bracket 20 is provided attached to valve 16 in order to support valve 16 on a base 22. Vessel 10 is likewise supported by base 22. A tapping saddle 24 in combination with adjustable clamps 26 operates to hold valve 16 adjacent vessel 10. In the held position, a valve passageway 28 of valve 16 is aligned to permit drill bit 18 to pass through valve 16 and engage vessel 10.

Figure 3:
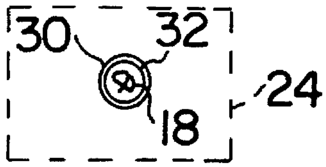
FIG. 3 is a front view of the saddle tap used in the tapping assembly of FIG. 1.
Figure 4:
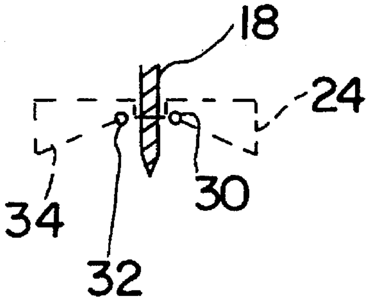
FIG. 4 is a top view of the saddle tap of FIG. 3.

As may be seen more clearly in FIGS. 3 and 4, tapping saddle 24 preferably includes an O-ring groove 30 encircling the path of drill bit 18. Groove 30 is preferably as small in diameter as possible while still permitting passage of drill bit 18. By minimizing the diameter, the pressure required to maintain a seal between tapping saddle 24 and vessel 10 is reduced. Tapping saddle 24 is fitted with a continuous O-ring 32 positioned in groove 30. Tapping saddle 24 has a curved surface 34 which is preferably machined to conform to the surface of vessel 10. Accordingly, as adjustable clamps 26 are tightened, O-ring 32 is compressed against the wall of vessel 10 and provides a seal between tapping saddle 24 and vessel 10. Tapping saddle 24 is in turn connected to valve 16 by any conventional coupler 36. Support bracket 20 supports valve 16 on base 22 but is not necessarily part of the mechanism which operates to hold valve 16 adjacent vessel 10.

In FIG. 1 there is further illustrated a drilling mechanism 40 comprising a drill housing 42, a hydraulic cylinder 44, a drive shaft 46, air drive motors 48 and 50, hydraulic pump 52, and drill bit chuck 54. Drive shaft 46 is longitudinally inserted through hydraulic cylinder 44 in a gas tight configuration. Drill bit chuck 54 is located at the proximal end of drive shaft 46 and, as is well known to those skilled in the art, operates to hold in place a drill bit 18 or other cutting element. Accordingly, as drive shaft 46 rotates, drill bit 18 correspondingly rotates. Air drive motor 48 is coupled to the distal end of drive shaft 46 in order to impart rotational motion to drill bit 18. Hydraulic pump 52, in combination with air drive motor 50, imparts longitudinal motion to drive shaft 46 in order to move drill bit 18 longitudinally toward and away from vessel 10.

In accordance with the present invention, a coupler is provided, including a cutting element passageway, for connecting, upon rotation of said coupler in one direction, the drill housing to the main valve with the coupler aligned to permit, with the main valve open, the cutting element to extend from the housing, through the cutting element passageway, through the valve passageway, to engage the unit being tapped, and for disconnecting the drill housing from the main valve upon rotation of the coupler in the opposite direction.

Figure 2:
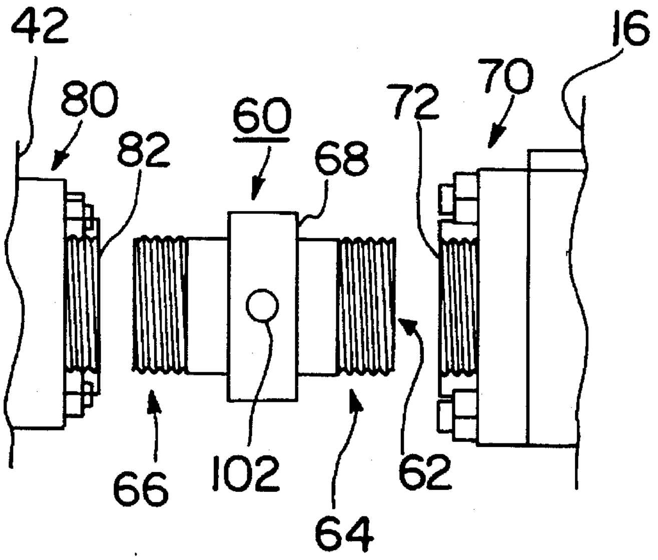
FIG. 2 is a cross-sectional view of a coupler in accordance with the teachings of the present invention.

In FIG. 2, an illustrative preferred embodiment of a coupler 60 is shown to include passageway 62, right-hand threads 64, left-hand threads 66 and gripping nut 68. Main valve 16 is shown in FIG. 2 as including an end piece 70 having threads 72 configured to receive right-hand threads 62 from coupler 60. Drill housing 42 is shown having end piece 80 which in turn has threads 82 adapted to receive left-hand threads 66 of coupler 60. Coupler 60 thereby operates when threads 64 are engaged with threads 72 and threads 66 are engaged with threads 82 to connect drill housing 42 to main valve 16 by rotation of coupler 60 in a first direction. Gripping nut 68, as should be understood by those skilled in the art, is readily available to impart rotational movement to coupler 60. When coupler 60 is rotated in the opposite direction, drill housing 42 is readily disconnected from main valve 16. When so disconnected, drill bit chuck 54, as shown in FIG. 1, is readily accessible to permit replacement of drill bit 18.

Drill housing 42 is longitudinally moveable along base 22 as coupler 60 is rotated to disconnect housing 42 from main valve 16. This longitudinal movement is permitted, for example, through use of a drill housing support 90 as shown in FIG. 1, which is attached to drill housing 42 and which is available to slide along base 22 while supporting housing 42.

While drilling mechanism 40 is illustrated in FIG. 1 as comprising a mechanism to drive a drill bit, it should be understood that drilling mechanism 40 may be replaced by any equivalent cutting mechanism and related cutting element. For example, drilling mechanism 40 might be replaced by a laser mechanism in which the cutting element were a light beam instead of a drill bit. Air drive motors 48 and 50 might readily be replaced by other forms of motors or related control mechanisms. Hydraulic cylinder 44 might be replaced by a corresponding packing structure which permitted access of a cutting element into engagement with the walls of vessel 10 while permitting sealing of any fluids or gases escaping from vessel 10 through operation of that cutting element.

In accordance with a preferred embodiment of the present invention, a vent 100 is illustrated in FIG. 1 as being located upstream of main valve 16 to permit controlled removal of the contents of vessel 10 from vessel 10. In addition, a vent 102 is located downstream of main valve 16 to permit controlled removal of the contents of vessel 10 from coupler 60. Vent 100 may actually be located in an upstream portion of main valve 16 and vent 102 may actually be located on gripping nut 68 of coupler 60 as illustrated in FIG. 2. The operation of vents 100 and 102 are controlled preferably by corresponding bellow vent valves 104 and 106. Preferably, vents 100 and 102 are coupled by vent valves 104 and 106 to respective pressure pumps 108 and 110. Pressure pumps 108 and 110 permit scavenging of the contents from vessel 10 and coupler 60, respectively, as should be well understood by those skilled in the art.

Figure 5:
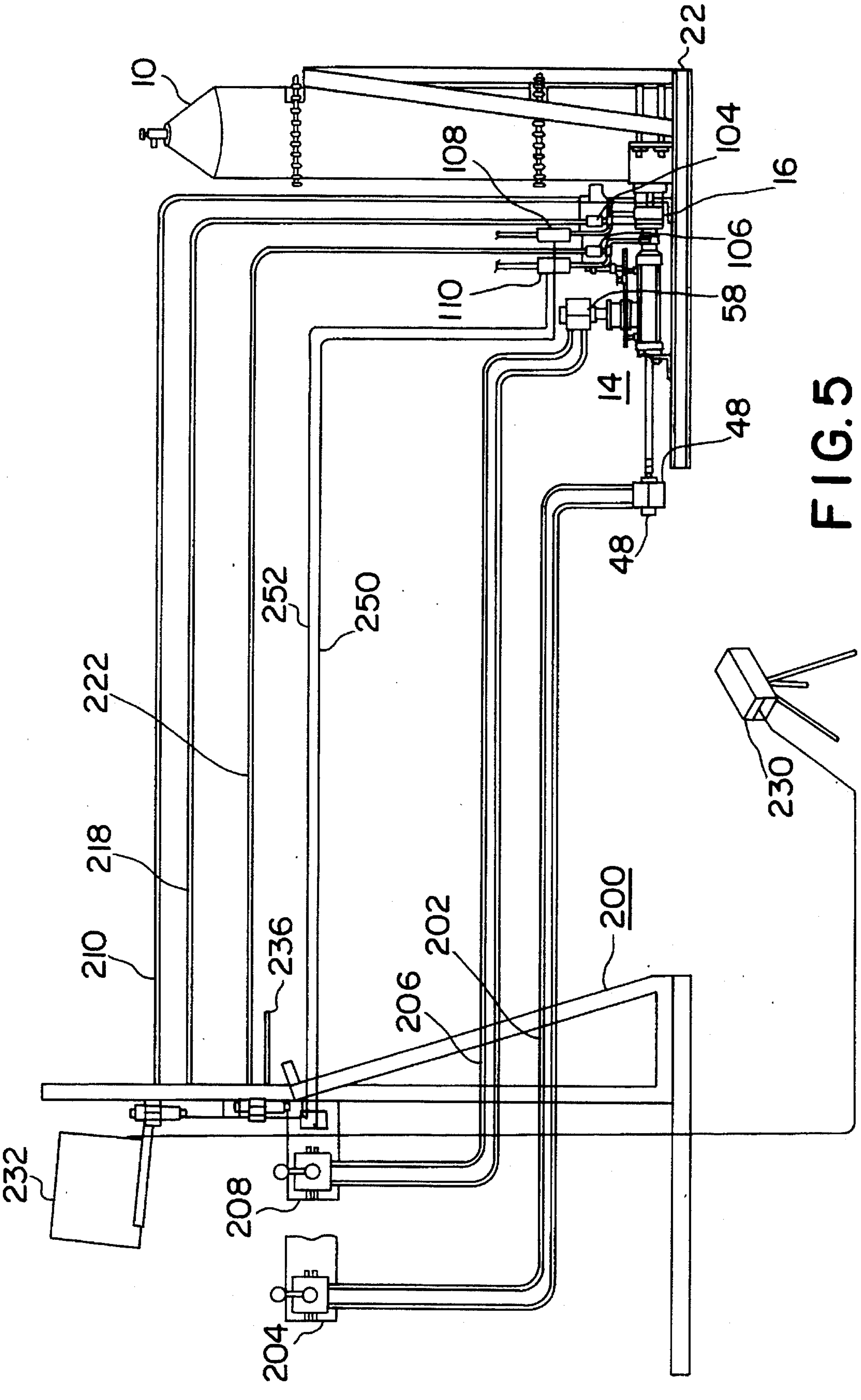
FIG. 5 is a cross-sectional view of a tapping assembly with a control panel in accordance with the present invention.
Figure 6:
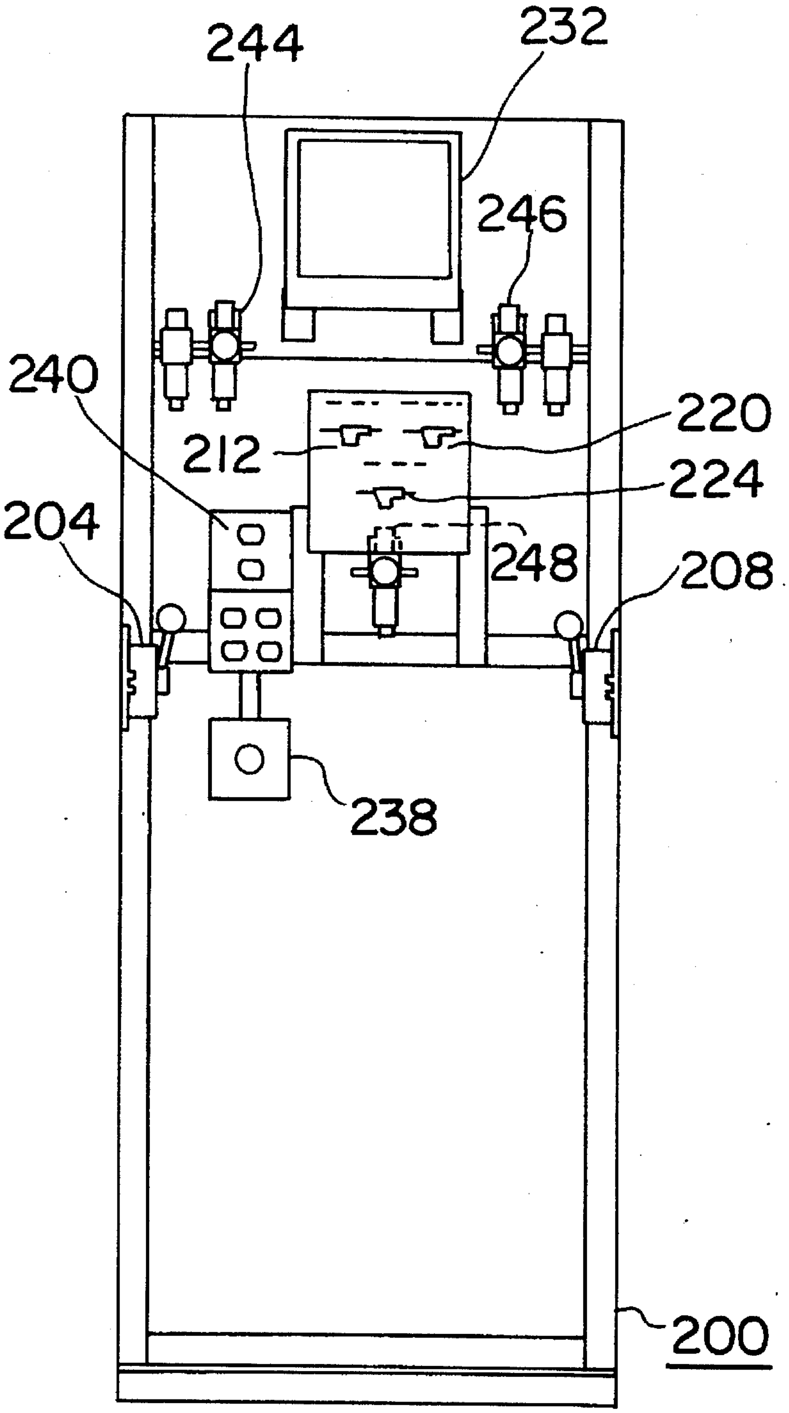
FIG. 6 is a front view of the control panel shown in FIG. 5.

The piercing of vessel 10 may be accomplished by workers from a remote location. The apparatus required for remote operation of tapping assembly 14 is illustrated in FIGS. 4 and 5. As shown in FIGS. 4 and 5, there is provided a control panel 200 a remote distance from tapping assembly 14, preferably on the order of magnitude of at least 25 feet. Air supply and vent lines 202 connect motor 48 to drill motor control 204 on panel 200. Air supply and vent lines 206 connect motor 58 to drill travel control 208 on panel 200. Control air line 210 connects main valve 16 to main valve control 212 on panel 200. Control air line 218 connects bellows vent valve 104 to valve control 220 on panel 200. Control air line 222 connects bellows vent valve 106 to valve control 224 on control panel 200.

A remote TV camera 230 may also be provided connected to a monitor 232 on control panel 200. Pressured air supply is provided to control panel 200 through line 236 from an air compressor not shown. Electrical power is supplied to control panel 200 through power connection 238 with remote light switches, camera switches, camera power connections and monitor power connections provided on electrical panel 240. Air connectors 244, 246 and 248 couple air from the compressor to the various valve controls 212, 220 and 224.

In operation, and with reference again to FIGS. 1 and 4, a drill bit 18 is retracted by motor 50 to a position downstream of main valve 16. With tapping saddle 24 appropriately positioned adjacent vessel 10, a seal at O-ring 32 is formed between saddle 24 and vessel 20 by operation of adjustment clamps 26. With main valve 16 closed, nitrogen gas may be introduced under pressure between valve 16 and vessel 10 through bellow vent valve 104 and upstream vent 100. This nitrogen gas is used along with soap and water to confirm that a tight seal has been formed to vessel 10. Once this seal is confirmed, the nitrogen gas may be purged through operation of pressure pump 108. Corresponding control lines 250 and 252 provide for remote operation of pressure pumps 108 and 110 at control panel 200. Valve 104 is then closed as is valve 106, and main valve 16 is opened. In this configuration, drill bit 18 is slowly rotated and advanced longitudinally through operation of motors 48 and 50 through passageway 62 of coupler 60, through passageway 28 formed in main valve 16, through O-ring 32 in tapping saddle 24 and adjacent vessel 10 as shown by position A in FIG. 1.

As drill bit 18 strikes vessel 10, a change may be noted in the pressure of the hydraulic cylinder 44, thereby indicating the arrival of drill bit 18 at position A. Drill bit is then continued to be rotated by operation of motor 48 and continued to be moved longitudinally by operation of motor 50 to pierce through the wall of vessel 10. Successful piercing of the wall may be detected by a change in pressure at either vent 100 or 102.

After vessel 10 is pierced, drill bit 15 is then retracted through operation of motor 50 to a position downstream of valve 16. Valve 16 may then be closed and the contents of vessel 10 extracted through vent 100. In the alternative, once valve 16 is closed, any of the contents of vessel 10 trapped in coupler 60 may be evacuated through operation of vent 102 and pump 110. Once this evacuation is complete, drilling mechanism 40 may be disconnected from valve 16 by rotation of coupler 60 and replaced with a suitable eductor tube, after which the contents of vessel 10 may be emptied directly through main valve 16 and the newly-positioned eductor tube.

As a preferred feature of the invention, provision is made for readily replacing drill bit 18. Specifically, should it become necessary for whatever reason to replace drill bit 18, drill bit 18 is extracted back to a position downstream of valve 16. Valve 16 is then closed and coupler 60 is purged of any of the contents of vessel 10 through operation of vent 102 and pump 110. After purging is complete, coupler 60 is rotated in a first direction to disconnect drilling mechanism 40 from valve 16. The utilization of right-hand threads 64 and left-hand thread 66 permit this disconnection as drill 16 slides rearwardly in a lateral direction along base 22. Once coupler 60 is unthreaded, drill bit chuck 54 is exposed permitting easy replacement of drill bit 18. With a new drill bit 18 in place, drilling mechanism 40 is easily reconnected to main valve 16 by rotation of coupler 60 in the opposite direction. In the alternative, drilling mechanism 40 may be replaced with a new drilling mechanism having a new drill bit 18 or drilling mechanism 40 may be removed to a location where drill bit 18 can more easily be replaced.

Additional advantages and modifications will readily occur to those skilled in the art. The invention in its broader aspects is not, therefore, limited to the specific details, representative methods and illustrative examples shown and described. Accordingly, departures may be made from such details without departing from the spirit or scope of applicants' general inventive concept.

What is claimed is:

1. A tapping assembly for gaining access to the contents of a container comprising:

a saddle having a surface contoured to conform to the surface of the container;

a main valve having open and closed positions, the main valve being connected to the saddle and being configured to permit a portion of an access mechanism to pass through the valve with the main valve in the open position to enable access to the contents of the container;

a housing for housing the access mechanism;

a coupler, connected between the housing and the main valve, the coupler including a passageway to permit at least a portion of the access mechanism extending from the housing to pass through the main valve and engage said container to permit access to the contents of the container; and a vent to permit controlled removal of contents of the container from said coupler with said main valve in the closed position.

2. The tapping assembly of claim 1 further comprising a pump coupled to the vent to assist in removal of the contents.

3. The tapping assembly of claim 1 wherein the access mechanism comprises a drilling mechanism.

4. The tapping assembly of claim 1 wherein the access mechanism comprises a laser.

5. The tapping assembly of claim 1 further comprising a valve down stream of the main valve to permit controlled removal of the contents of the container from the coupler.

6. The tapping assembly of claim 1 further comprising controlled means for remotely operating the tapping assembly.

* * * * *